(12) United States Patent
Jacobson et al.

(10) Patent No.: US 7,254,237 B1
(45) Date of Patent: Aug. 7, 2007

(54) SYSTEM AND METHOD FOR ESTABLISHING A SECURE CONNECTION

(75) Inventors: Van Jacobson, Woodside, CA (US); Kedar Poduri, Santa Clara, CA (US)

(73) Assignee: SLT Logic, LLC, Boston, MA (US)

( * ) Notice: Subject to any disclaimer, the term of this patent is extended or adjusted under 35 U.S.C. 154(b) by 617 days.

(21) Appl. No.: 10/042,886

(22) Filed: Jan. 7, 2002

Related U.S. Application Data

(60) Provisional application No. 60/337,229, filed on Dec. 3, 2001, provisional application No. 60/261,599, filed on Jan. 12, 2001.

(51) Int. Cl.
*H04L 9/00* (2006.01)
*H04L 9/32* (2006.01)

(52) U.S. Cl. .......................... 380/277; 726/6

(58) Field of Classification Search ........ 713/200–204, 713/151
See application file for complete search history.

(56) References Cited

U.S. PATENT DOCUMENTS

| | | | |
|---|---|---|---|
| 5,161,193 A | | 11/1992 | Lampson et al. |
| 5,594,869 A | | 1/1997 | Hawe et al. |
| 5,657,390 A | * | 8/1997 | Elgamal et al. ............. 713/151 |
| 6,006,264 A | * | 12/1999 | Colby et al. ................ 709/226 |
| 6,094,485 A | * | 7/2000 | Weinstein et al. ............ 380/30 |
| 6,119,230 A | | 9/2000 | Carter |
| 6,223,287 B1 | * | 4/2001 | Douglas et al. ............. 713/178 |
| 6,263,437 B1 | | 7/2001 | Liao et al. |
| 6,292,900 B1 | | 9/2001 | Ngo et al. |
| 6,317,831 B1 | * | 11/2001 | King .......................... 713/171 |
| 6,377,993 B1 | * | 4/2002 | Brandt et al. ............... 709/227 |
| 6,389,462 B1 | * | 5/2002 | Cohen et al. ............... 709/218 |
| 6,449,647 B1 | * | 9/2002 | Colby et al. ................ 709/226 |
| 6,484,257 B1 | * | 11/2002 | Ellis .......................... 713/153 |
| 2001/0005883 A1 | | 6/2001 | Wray et al. |
| 2001/0047474 A1 | | 11/2001 | Takagi et al. |
| 2002/0004898 A1 | | 1/2002 | Droge |

OTHER PUBLICATIONS

Introduction to SSL downloaded from the Internet on Jun. 27, 2006 from http://docs.sun.com/source/816-6156-10/contents.htm#1050729, pp. 1-11.

* cited by examiner

*Primary Examiner*—Nasser Moazzami
*Assistant Examiner*—Brandon Hoffman
(74) *Attorney, Agent, or Firm*—Patterson, Thuente, Skaar & Christensen, P.A.

(57) ABSTRACT

A system and method initiates secure sessions without occupying a process on the server until the premaster key is received from the client.

5 Claims, 5 Drawing Sheets

SYSTEM AND METHOD FOR ESTABLISHING A SECURE CONNECTION

RELATED APPLICATIONS

This application claims the benefit of application Ser. No. 60/261,599 entitled, "System and Method for Offloading Responses to Network Communications" filed on Jan. 12, 2001 by Van Jacobson, and application Ser. No. 60/337,229, entitled "Method and Apparatus for Establishing a Secure Connection" filed on Dec. 3, 2001 by Van Jacobson and Kedar Poduri, and is related to application Ser. No. 60/261,598, entitled "Method and Apparatus for Efficient Input/Output of a Computer System" filed on Jan. 12, 2001 by Van Jacobson, and each is incorporated herein by reference in its entirety.

FIELD OF THE INVENTION

The present invention is related to computer software and more specifically to computer networking software.

BACKGROUND OF THE INVENTION

Conventional communication made over networks such as the Internet are unsecure until a secure protocol is arranged and used for communications. One way of arranging a secure protocol is by using the conventional Secure Sockets Layer protocol known as SSL. SSL allows two communicating parties to determine an encryption technique both parties can support, and to agree on certain parameters to be used with the encryption technique. Communications may then be sent securely using the agreed upon encryption technique.

Under the SSL protocol, a client initiates a request for a secure connection and includes a cryptographic suite describing the client's capabilities. The server receives the cryptographic suite, initiates a process on the server to handle the encrypted session, selects an encryption technique from those described by the client's cryptographic suite, generates a session identifier that is used to identify subsequent communications that will use the selected encryption technique and a session key computed as described below, and returns the selected encryption technique, session identifier and other information including an optional certificate that can be used to authenticate the server and to encrypt a response. The server may also optionally request a certificate from the client.

The client then optionally validates the server certificate and then generates a premaster secret key, encrypts it using the server's public key and sends it to the server. The server decrypts the premaster key using its secret key. The client and server both use the premaster secret key to generate a session key that can be used to encrypt subsequent communications between the client and the server. Each signals the other when they have generated the session key and one or more communications may be made using the session identifier, the selected encryption technique and the session key.

However, there is a problem with this technique. The server initiates the process to handle session communications when the client's cryptographic suite is received, but then must wait for the premaster secret key, which can take as long as several minutes to generate. During this time, the process sits idle, consuming server resources and potentially preventing other clients from communicating with the server.

What is needed is a system and method that can initiate a secure session between a client and server without requiring a process on the server to sit idle between the time the client's cryptographic suite is received and the client sends the server the premaster secret key.

SUMMARY OF INVENTION

A system and method responds to the clients cryptographic suite without initiating a separate process on the server to handle subsequent encrypted communications. The system and method responds to the request either without the use of a server or by using a single process on the server to respond to cryptographic suites received from all clients. When the premaster secret key is received, the system and method may send the server the request for the secure session which it stores, having been stored when it was initially received, intercept the server's response without forwarding it to the client, and then rapidly send the server the premaster secret key. If the server is modified not to respond to the request, the system and method may simply send the premaster secret key. The system and method can forward subsequent communications between the client and server.

DETAILED DESCRIPTION OF A PREFERRED EMBODIMENT

Figure 1:
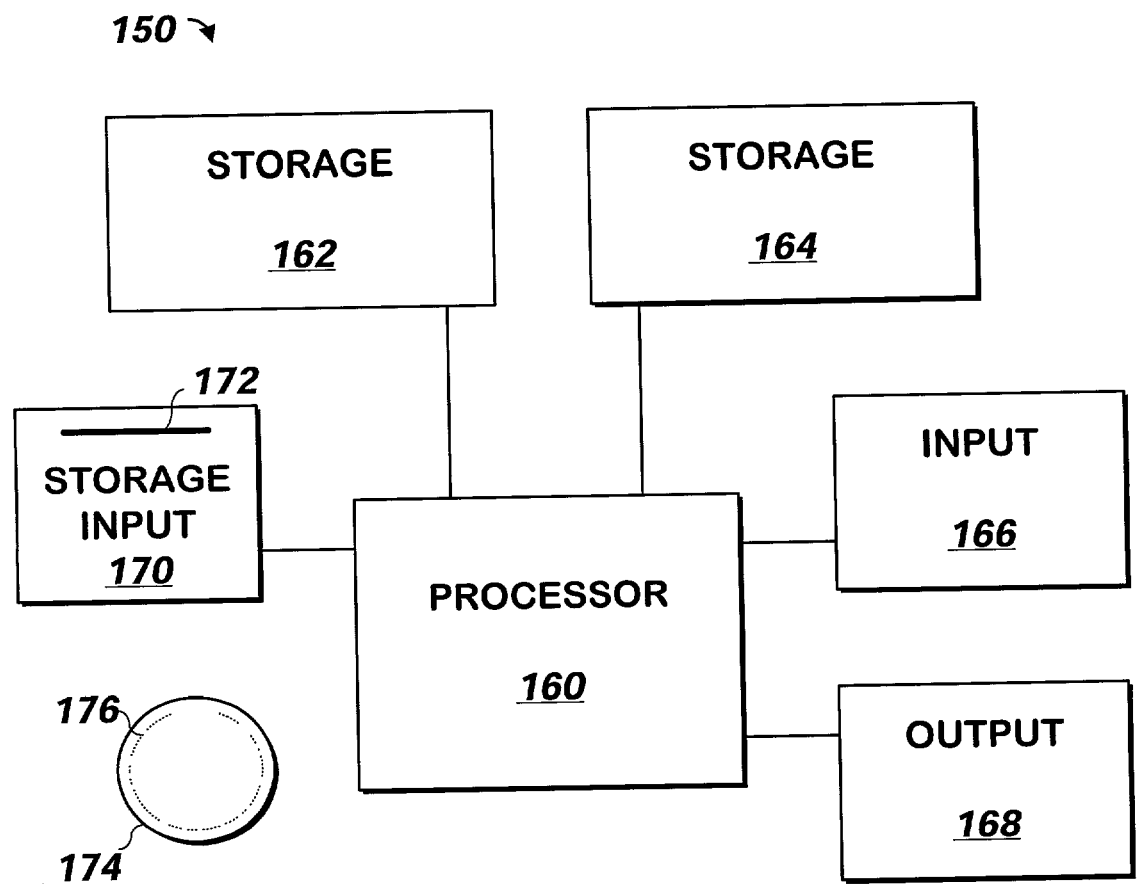
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or running the FreeBSD operating system commercially available from the website freebsd.org, or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2A:
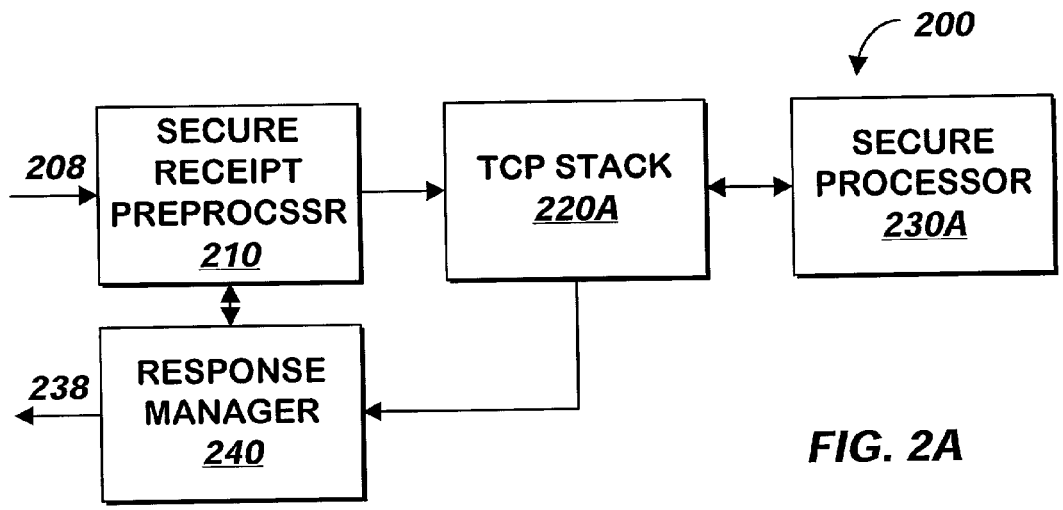
FIG. 2A is a block schematic diagram of a system for establishing a secure connection according to one embodiment of the present invention.

Referring now to FIG. 2A, a system 200 for establishing a secure connection is shown according to one embodiment of the present invention. In one embodiment, all communication into system 200 is made via input 208 of secure receipt preprocessor 210 which is coupled to a network such as the Internet or a local area network or both. In one embodiment, all communication out of system 200 is made via output 238 of response manager 240, which is coupled to a network such as the Internet or a local area network or both. Secure receipt preprocessor 210 and response manager 240 contain conventional communication interfaces that support TCP/IP or other conventional communication protocols.

Overview

Figure 3:
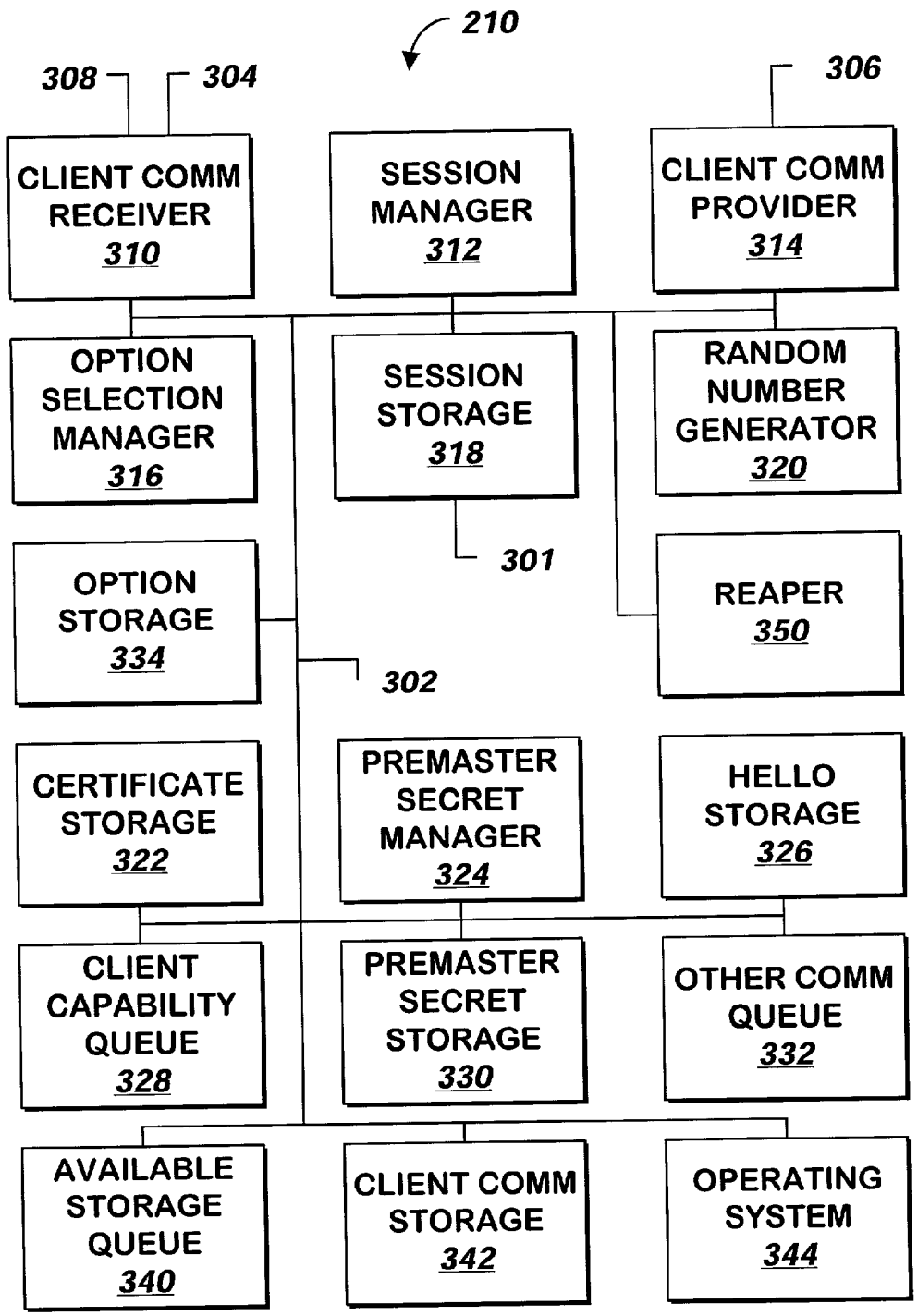
FIG. 3 is a block schematic diagram of secure receipt preprocessor 210 of FIG. 2A and FIG. 2B in more detail according to one embodiment of the present invention.

Referring now to FIG. 2A, a system for establishing a secure connection is shown according to one embodiment of the present invention. Also referring to FIG. 3, secure receipt preprocessor 210 of FIG. 2A is shown in more detail according to one embodiment of the present invention. In the embodiment illustrated in FIG. 2A, secure preprocessor 210 and response manager 240 connect logically between a server and its clients, act in the manner of a proxy for the server during the initialization phase of a secure connection, and forward communications to and from secure processor 230A of a server to the one or more clients. TCP stack 220A is a conventional TCP stack, such as is found in conventional protocol suites for many operating systems. Secure processor 230A contains a conventional process for managing the initiation and maintenance of a conventional secure communication and there may be one secure processor 230A active for each client or one secure processor 230A may manage the initiation and maintenance for multiple clients. In one embodiment, system 200 can communicate with both a client and a server using the SSL protocol as a secure communication protocol. The SSL version 3.0 protocol is described in an Internet Draft dated November, 1996, available from the Netscape web site at home.netscape.com/eng/ssl3/draft302.txt, and is hereby incorporated by reference herein in its entirety. In one embodiment, system 200 communicates with both a client and server using the TLS protocol as a secure communication protocol, although other protocols may be used. The TLS protocol is described in RFC 2246, "The TLS Protocol", which can be found on the website of the Internet Engineering Task Force, ietf.org, and is hereby incorporated by reference herein in its entirety. In still another embodiment, system 200 communicates using both such protocols.

A. Initial Communication

Secure receipt preprocessor 210 receives an initial communication via input 208 from a client wishing to initiate a secure communication. In one embodiment, the client includes a personal computer having suitable communication equipment and running suitable communication software including a conventional browser as described above and is coupled to secure receipt preprocessor 210 via a conventional network such as the Internet. As noted above, there may be multiple clients coupled to a single secure receipt preprocessor 210.

Client communications receiver 310 receives the communication via input 308, which is coupled to input 208. In one embodiment, client communications receiver 310 contains a conventional TCP interface that reassembles the data stream, acknowledges receipt of data, and performs other functions of such an interface.

When client communications receiver 310 determines that it has received the last byte of the initial communication from the client, client communications receiver 310 stores the communication in client communication storage 342. To store the communication in client communication storage 342, client communications receiver 310 selects from available storage queue 340 the address of the first available block of storage in client communication storage 342, removes the address from available storage queue 340, and stores the communication at the selected address.

Available storage queue 340 is a conventional queue containing the address of every block of storage in client communication storage 342. The management of the available storage queue 340 will now be described. A conventional queue is a first-in-first-out list of items plus a head-of-queue pointer and an end-of-queue pointer. In one embodiment, the item contains a storage address. In one embodiment, the storage addresses within the items refer to blocks of unused storage within client communication storage 342, each block being large enough to contain the largest expected entry. To remove the first item from a queue, a process retrieves the address of the item to be removed from the storage location referred to by the head-of-queue pointer in available storage queue 340, then updates the head-of-queue pointer to the next sequential storage location by adding the length of a queue item to the head-of-queue pointer. In one embodiment, if the head-of-queue pointer exceeds a threshold when updated in this manner, the process then subtracts the length of the queue from the head-of-queue pointer. In one embodiment, the head-of-queue pointer is an offset from the first memory location to be used for the queue, and so when the threshold is reached, the process sets the head-of-queue pointer to zero.

Once client communications receiver 310 has stored the communication in client communication storage 342, client communications receiver 310 retains the pointer to the communication and creates an identification object. To create an identification object, client communications receiver 310 extracts the source IP address and port, destination IP address and port, and protocol from the header information provided with the communication, and uses this information to create an identification object.

Client communications receiver 310 scans a table of open connections that client communications receiver 310 maintains in local storage within client communications receiver 310, looking for an entry that matches the identification object. If client communications receiver 310 does not find such an entry, client communications receiver 310 creates an entry from the identification object and stores the entry in the table in local storage.

If client communications receiver 310 has created such a table entry, then system 200 did not have an open connection matching the one requested by the client, and if the destination port in the identification object corresponds to an HTTPS port, client communications receiver 310 assumes that the communication is a request to initiate a secure connection, herein called a "client hello". Client communications receiver 310 requests and receives a timestamp consisting of the current date and time from operating system 344.

Client communication receiver 310 creates an entry consisting of the pointer it retained (herein referred to as the client hello pointer), the timestamp received, and the identification object, and adds the entry to client capability queue 328. An entry containing a client hello pointer, a timestamp, and an identification object is herein referred to as a client hello entry.

To add an item to a queue, a process updates the end-of-queue pointer to the next sequential storage location by adding the length of an item to the end-of-queue pointer, and stores the address of the item at the address referred to by the end-of-queue pointer. In one embodiment, if the end-of-queue pointer exceeds a threshold when updated in this manner, the process subtracts the length of the queue from the end-of-queue pointer (or sets the end-of-queue pointer to zero) before storing the address of the item as described above.

Client capability queue 328 is a conventional queue containing multiple entries arranged in a similar manner to available storage queue 340 described above, except that client capability queue 328 contains client hello entries, rather than a list of storage addresses of available blocks.

After client communications receiver 310 has placed the client hello entry on client capability queue 328, session manager 312 processes the client hello entry as will now be described.

Session manager 312 continually monitors client capability queue 328 and if it locates an entry at the top of the queue, session manager 312 processes the client hello entry as will now be described. Whenever session manager 312 detects that client capability queue 328 is not empty, session manager 312 selects the first client hello entry from client capability queue 328, removes the selected client hello entry from client capability queue 328, and places the selected client hello entry in hello storage 326.

In one embodiment, session manager 312 uses the identification object within the selected client hello entry as input to a hashing algorithm, and uses the resulting hash result as an index into hello storage 326. To hash the identification object, session manager 312 uses a conventional hashing algorithm such as RSA. In another embodiment, session manager 312 uses the MD5 or SHA hashing algorithm, although other embodiments may use other hashing algorithms. RSA, MD5 and SHA are described in Applied Cryptography, by Bruce Schneier, John Wiley & Sons, Inc., 1996, including without limitation Section 18.12, which is hereby incorporated herein by reference in its entirety.

Once session manager 312 has created a hash index, session manager 312 stores the selected client hello entry in hello storage 326. Hello storage 326 is arranged as a series of client hello entries. To store the selected client hello entry in hello storage 326, session manager 312 chooses and examines the hello storage 326 entry referred to by the hash index. If the chosen storage location is not occupied, then session manager 312 stores the selected client hello entry in the chosen client hello entry. A client hello entry in hello storage 326 is not occupied when the identification object portion of the entry contains zeroes.

If the chosen client hello entry is occupied, then session manager 312 chooses the next sequential client hello entry within hello storage 326, examines the chosen client hello entry, and proceeds as described above until session manager 312 has stored the selected client hello entry in an unoccupied entry in hello storage 326.

Once session manager 312 has stored the selected client hello entry in hello storage 326, session manager 312 selects and examines the client hello referred to by the client hello pointer in the selected client hello entry. If the selected client hello does not contain a session ID, session manager 312 extracts the identification object from the selected client hello entry, generates a session ID, and creates a session ID entry containing the generated session ID and the identification object.

In one embodiment, session manager 312 generates a session ID by adding one to the previously generated session ID. In such embodiment, if session manager 312 has not yet generated a session ID, then session manager 312 generates a session ID of zero.

In another embodiment, session manager 312 generates a session ID by requesting and receiving a random number from random number generator 320 as described below.

Once session manager 312 has generated a session ID, session manager 312 scans the session ID entries in session storage 318 to ensure that the generated session ID is not currently in use. If session manager 312 determines that the generated session ID is in use, session manager 312 generates another session ID, repeats the process of checking for uniqueness and continues to generate session IDs as described above until session manager 312 determines that the generated session ID is not currently in use.

In still another embodiment, session manager 312 generates a queue of available session IDs during system 200 initialization. In such embodiment, instead of generating a session ID, session manager 312 selects and removes the first available session ID from the session ID queue. When a session ID is removed from session storage 318 as described below, session manager 312 replaces the session ID on the session ID queue.

Once session manager 312 has created a session ID entry, session manager 312 stores the session ID entry in session storage 318 and requests and receives a random number (to be provided to the client that sent the communication as described below to allow the client to generate a session key) from random number generator 320.

Random number generator 320 receives the request from session manager 312 and generates a random number. In one embodiment, random number generator 320 generates a pseudo-random number, for instance using the Blum-Micali generator. A description of the Blum-Micali generator can be found in Applied Cryptography by Bruce Schneier. Once random number generator 320 has generated a random number, random number generator 320 sends the random number to session manager 312.

Session manager 312 receives the random number, and sends the random number, the generated session ID, and the client hello pointer to option selection manager 316.

Option selection manager 316 receives the random number, the generated session ID, and the client hello pointer and generates a portion of a response to the client. In order to generate a portion of a response to the client, option selection manager 316 reads a set of configuration options from option storage 334.

In one embodiment, a system administrator uses a user interface provided by client communication receiver 310 to transmit a set of configuration options to secure receipt processor 210. In such embodiment, client communication receiver 310 receives the set of configuration options and stores the set of configuration options in option storage 334.

In one embodiment, the set of configuration options contains a protocol version, a list of ciphers, and a list of compression methods. These configuration options correspond to a similar list of options that secure processor 230A would use to respond to the client hello if secure processor 230A had received the client hello from the client.

Option selection manager 316 examines the client hello and constructs a portion of the response by comparing the capabilities expressed in the client hello to the set of configuration options stored in option storage 334. In one embodiment, the client hello contains a protocol version. In such embodiment, option selection manager 316 chooses the lesser of the client hello protocol version and the protocol version in the set of configuration options.

In one embodiment, the client hello contains a list of ciphers. In such embodiment, option selection manager 316 chooses the first cipher in the client hello list of ciphers that is also in the list of ciphers in the set of configuration options stored in option storage 334.

In one embodiment, the client hello contains a list of compression methods. In such embodiment, option selection manager 316 chooses the first compression method in the client hello list of compression methods that is also in the list of compression methods in the set of configuration options stored in option storage 334.

In one embodiment, the list of configuration options contains a "request client authentication" option. In such embodiment, option selection manager 316 examines the "request client authentication" option stored in option storage 334, and if true, constructs a client authentication request, such as a certificate request.

In one embodiment, the list of configuration options stored in option storage 334 contains a "provide server authentication" option. In such embodiment, selection manager 316 examines the "provide server authentication" option, and if true, selection manager 316 examines the chosen cipher and uses the chosen cipher to choose a server authentication, such as a certificate, from certificate storage 322.

Option selection manager 316 sends the random number, generated session ID, chosen protocol version, chosen cipher, chosen compression method, the client certificate request if the "request client authentication" option is true, the chosen server certificate if the "provide server authentication" option is true, and the client hello pointer to response manager 240 via input/output 302.

Response manager 240 receives the chosen protocol version, chosen cipher, chosen compression method, generated session ID, and random number, receives the client certificate request if provided, receives the chosen server certificate if provided, and receives the client hello pointer. Response manager 240 formats the chosen protocol version, random number, generated session ID, chosen cipher, and chosen compression method into a response to the client hello, herein called a server hello, by building a TCP packet with a header in which the source and destination addresses are swapped, source and destination ports are swapped, and the protocol is copied from the TCP header of the client hello pointer. The server hello is described in the documents regarding SSL version 3 protocol and the TLS version 1 protocol, cited above.

Response manager 240 sends the server hello to the client via output 238. If response manager 240 has received a server certificate, response manager 240 sends the chosen server certificate to the client via output 238. If response manager 240 has received a client certificate request, response manager 240 sends the client certificate request to the client via output 238. Response manager 240 sends an indication that response manager 240 has completed response manager's 240 reply, herein called a "server hello done" to the client via output 238.

Thus, the server hello is sent "sineprocessly," which means: prior to any initiating, or assigning the client to, a process on the server to handle subsequent secure communications from that client, as identified by any or all of the source IP address, source port and protocol.

The Client Replies

Once response manager 240 has sent the "server hello done", system 200 can receive another communication. Secure receipt preprocessor 210 receives the communication via input 208. As described above, client communication receiver 310 receives the communication via input 308, which is coupled to input 208. Client communications receiver 310 stores the communication in client communication storage 342 and retains the pointer to it as described above.

Client communication receiver 310 creates an identification object from this communication as described above, and scans the table in local storage for the identification object as described above. If client communication receiver 310 locates an entry in the table that matches the identification object, then client communication receiver 310 examines the located entry to see if the located entry is marked. If the located entry is not marked, then client communications receiver 310 assumes that a client hello has been received (since the entry exists), but that no client reply has been received (since the entry is not marked).

Client communication receiver 310 therefore assumes that the communication contains a premaster secret, so client communication receiver 310 marks the located entry in the table in local storage and requests and receives another timestamp from operating system 344 as described above. A communication containing a premaster secret is herein referred to as a client reply.

Client communication receiver 310 creates an entry from the address of the client reply in client communication storage 342 (herein referred to as the reply pointer), the timestamp, and the identification object, stores the entry in premaster secret storage 330, and sends the reply entry to premaster secret manager 324.

In one embodiment, so as to quickly locate the reply entry as described below, client communication receiver 310 uses the identification object within the reply entry to form a hash as described above, and stores the reply entry in premaster secret storage 330 indexed by the hash index in a similar manner to the way that session manager 312 stores the client hello entry in hello storage 326.

Premaster secret manager 324 receives the reply entry and locates and sends the corresponding client hello to the server. To locate and send the client hello, premaster secret manager 324 extracts the identification object from the reply entry and scans hello storage 326 for a client hello entry with the same identification object. In the embodiment where client hello entries are stored in hello storage 326 indexed by a hash, premaster secret manager 324 generates a hash index from the identification object as described above and uses the hash index to locate the client hello entry. Once premaster secret manager 324 has located such a client hello entry, premaster secret manager 324 removes the client hello entry from hello storage 326 and places the client hello pointer from the client hello entry onto the end of other communication queue 332, a conventional queue arranged in a similar manner to client capability queue 328, described above.

After premaster secret manager 324 has added the client hello pointer to other communication queue 332, client communication provider 314 processes the client hello pointer as will now be described.

Client communication provider 314 continually monitors other communication queue 332, and transmits the data referred to by the entries it finds to TCP stack 220A. When client communication provider 314 detects that other communication queue 332 is not empty, client communication provider 314 selects the first pointer from other communication queue 332, and removes the pointer from other communication queue 332.

Client communication provider 314 sends the client hello via output 306, which is coupled to TCP stack 220A. Client communication provider 314 places the client hello pointer on available storage queue 340.

TCP stack 220A is a conventional TCP stack, as is provided with one or more of the operating systems described above. TCP stack 220A receives the client hello from client communication provider 314 and forwards the client hello to secure processor 230A.

Secure processor 230A receives the client hello and generates its own server hello. Secure processor 230A is a conventional SSL-enabled or TLS-enabled HTTP server, such as the Microsoft IIS server, commercially available from Microsoft Corporation of Redmond, Wash. Secure processor 230A examines the client hello and generates its own server hello using the same process of selection used by option selection manager 316 described above, and may send a server certificate and generate a client certificate request according to parameters for these items on the secure processor 230A. Secure processor 230A sends the server hello, optionally sends the server certificate, and optionally sends the client certificate request, to TCP stack 220A.

TCP stack 220A receives the server hello, and receives the server certificate and client certificate request if provided. TCP stack 220A forwards the server hello to response manager 240, forwards the server certificate to response manager 240 if the server certificate has been provided, and forwards the client certificate request to response manager 240 if the client certificate request has been provided.

Response manager 240 receives the server hello and extracts the session ID from the server hello. Response manager 240 stores the extracted session ID in session storage 318 in the session ID entry corresponding to the client hello to which the server hello is responding. To extract and store the server-provided session ID, response manager 240 receives the server hello, receives the server certificate if provided, and receives the client certificate request if provided. Response manager 240 extracts the source IP address and port, destination IP addresses and port, and protocol from the header information provided with the server hello. Response manager 240 creates a search object from the source IP address and port, destination IP addresses and port, and protocol in the same manner as client communication receiver 310 creates the identification object, but with the source IP address and the destination IP address swapped, and the source port and destination port swapped.

Response manager 240 scans session storage 318 via input/output 301 for a session ID entry containing an identification object that matches the search object. (In one embodiment, input/output 301 is coupled to input/output 302 to form a single input/output.) When response manager 240 locates such a session ID entry, response manager 240 extracts the session ID from the server hello, requests and receives a current timestamp from operating system 344 as described above, and stores the session ID from the server hello (herein called the server session ID) and the timestamp in the located session ID entry in session storage 318. Response manager 240 discards the remainder of the server hello received from the server, any server certificate, and any client certificate request. Once response manager 240 has updated session storage 318, response manager 240 sends the search object to premaster secret manager 324 via input/output 302.

Premaster secret manager 324 receives the search object and scans premaster secret storage 330 for a reply entry that contains an identification object that matches the search object. In the embodiment where the reply entry is stored using a hash index, premaster secret manager 324 computes a hash from the search object as described above and uses the hash as an index into premaster secret storage 330 to locate the reply entry.

When premaster secret manager 324 finds such a reply entry, premaster secret manager 324 removes the reply entry from premaster secret storage 330 and adds the reply pointer in the reply entry to other communication queue 332.

When the reply pointer reaches the top of other communications queue 332, client communication provider 314 removes the reply pointer from other communication queue 332, and sends the client reply corresponding to the pointer to TCP stack 220A in a similar manner to the way that client communication provider processed the client hello entry as described above. Client communication provider 314 places the reply pointer on available storage queue 340.

TCP stack 220A forwards the client reply to secure processor 230A in a manner similar to the way that TCP stack 220A forwards the client hello as described above. Secure processor 230A receives and examines the client reply. If the client reply contains a client certificate, secure processor 230A validates the client certificate using conventional validation techniques. Secure processor 230A uses the premaster secret in the reply to generate a session key, and uses the session key to encrypt communications with the client until the session key expires as described in the protocol.

Non-Handshake Communications

Subsequent communications may be received from a client after the client reply (containing the premaster) is received. Secure receipt preprocessor 210 receives a communication from the client via input 208 as described above; client communication receiver 310 receives the communication via input 308 coupled to input 208 as described above. Client communication receiver 310 stores the communication in client communication storage 342 as described above, constructs an identification object as described above, and scans the internally-stored open sessions table for an entry that matches the identification object. If client communication receiver 310 locates such an entry, client communication receiver 310 determines whether or not the entry is marked. If the entry is marked, then client communication receiver 310 assumes that the handshake for this client has already completed, so client communication receiver 310 stores the pointer to the communication on other communication queue 332, and the communication is processed by client communication provider 314 as described above.

Once client communication provider 310 has received and stored a communication and constructed an identification object as described above, client communication provider examines the communication to see if it contains a "close connection" flag. If the communication contains a "close connection" flag, then client communication provider 310 scans the open sessions table it internally stores, locates the entry matching the identification object, and deletes the entry from the table.

Client Provides an Acceptable Session ID

A client may provide a previously-provided session ID in a client hello in order to continue the session initiated using a prior client hello. When session manager 312 receives a client hello as described above, after it builds the client hello entry and stores it in hello storage 326, session manager 312 examines the client hello to determine if the client hello contains a session ID as described above. If session manager 312 determines that the client hello contains a session ID, then session manager 312 extracts the session ID from the selected client hello and scans session storage 318 looking for a session ID entry containing the extracted session ID in the generated session ID field.

System 200 attempts to duplicate the operation of the SSL server of which secure processor 230A is a part. In particular, session manager 312 attempts to accept session IDs that secure processor 230A would accept, and reject session IDs that secure processor 230A would reject. In order to determine whether or not to accept a session ID, session manager 312 examines one or more fields in the located session ID entry.

In one embodiment, session manager 312 checks to see if the server session ID is acceptable by checking the timestamp in the located session ID entry. Session manager 312 extracts the timestamp from the located session ID entry, requests and receives a current timestamp from operating system 344 as described above, and subtracts the extracted timestamp from the current timestamp to compute the session ID age.

Session manager 312 requests and receives the session ID lifespan option from option selection manager 316. Option selection manager 316 extracts the session ID lifespan option from the set of configuration options and sends the session ID lifespan option to session manager 312 when requested. A system administrator uses option selection manager 316 to set the session ID lifespan option to a duration equal to or less than the maximum duration secure processor 230A would allow to elapse between the time it provided the session ID and the time a client hello with that session ID was received and still accept the client hello.

Session manager 312 compares the session ID age to the session ID lifespan, and accepts the server session ID if the session ID age is less than the session ID lifespan.

In other embodiments, session manager 312 uses other criteria when checking to see if the server session ID is acceptable, as long as the criteria correspond to the criteria the server will user to determine whether to accept the session ID.

Once session manager 312 has determined that the server session ID is acceptable, session manager 312 replaces the session ID in the client hello stored in client communication storage 342 with the server session ID from the located session ID entry. This adjusts the session ID from the session ID provided by secure receipt preprocessor 210 which the client believes is the session ID to the session ID expected by secure processor 230A.

Session manager 312 removes the selected client hello entry from hello storage 326 and places the client hello pointer on other communication queue 332.

Client communication provider 314 removes the selected client hello entry from other communication queue 332 and sends the client hello referred to by the client hello pointer to secure processor 230A via TCP stack 220A as described above, and places the client hello pointer on available storage queue 340. Secure processor 230A receives the client hello. Secure processor 230A extracts the session ID from the client hello and uses the session ID to resume a secure session with the client.

Client Provides an Unacceptable Session ID

A client may provide a session ID as part of a client hello for a session that has expired. When session manager 312 examines the session ID as described above, if session manager 312 determines that the generated session ID is not acceptable, session manager 312 builds a new session ID entry from a newly generated session ID and the identification object from the selected client hello as described above. Session manager 312 stores the new session ID entry in session storage 318, requests and receives a random number from random number generator 320, and sends the newly generated session ID, the client hello pointer, and the random number to option selection manger 316 as described above. Option selection manager 316 generates a portion of the server hello and causes response manager 240 to send the server hello to the client as described above.

Client Provides an Acceptable Session ID, But Server Does not Accept it

In one embodiment, it is possible for the server to reject a session ID as expired that session manager 312 accepted as unexpired as described above. Session manager 312 accepts a session ID and causes the associated client hello to be sent to secure processor 230A as described above, but secure processor 230A decides that the session ID is not acceptable. In this case, secure processor 230A generates a server hello containing a new session ID, and sends the server hello to response manager 240 via TCP stack 220A as described above.

Response manager 240 receives the server hello, creates a search object, and scans session storage 318 for a session ID entry with an identification object that matches the search object as described above. When response manager 240 locates such a session ID entry, response manager 240 examines the located session ID entry and determines whether or not the located session ID entry contains a server session ID. If the located session ID entry does not contain a server session ID, then the received server hello is a response to a client hello that did not contain a session ID, and the operation of response manager 240 is as described above.

If the located session ID entry contains a server session ID, then the received server hello is in response to an unacceptable session ID, so response manager 240 updates the located session ID entry by extracting the session ID from the server hello and storing the extracted session ID in both the generated session ID field and the server session ID field in the located entry, and by requesting and receiving a timestamp as described above and storing the timestamp in the located session ID entry. Once response manager 240 has updated the located session ID entry, response manager 240 sends the received server hello to the client via output 238 as described above.

Incomplete Communications

Due to the nature of telecommunications, the secure communication initialization may be interrupted before completion. If this occurs, then hello storage 326 and/or premaster secret storage 330 may contain entries that are never processed and thus never freed. To avoid this condition, reaper 350 periodically requests and receives a timestamp from containing the current date and time from operating system 344, scans hello storage 326, and compares the timestamp of each entry to the current timestamp. Reaper 350 deletes each entry in hello storage 326 found by option selection manager 316 to be older than a threshold such as ten minutes. In one embodiment, the threshold is part of the list of configuration options stored in option storage 334 as described above, which reaper 350 requests and receives.

To delete an entry in hello storage 326, reaper 350 extracts the client hello pointer from the entry to be deleted, places the client hello pointer on available memory queue 340, and stores zeroes in the identification object field of the entry to be deleted.

Additionally, reaper 350 periodically requests and receives a timestamp and scans premaster secret storage 330 in a similar manner to the way that reaper 350 scans hello storage 326, deleting each entry in premaster secret storage 330 found by reaper 350 to be older than the threshold stored in option storage 334 by a system administrator as described above.

To delete an entry in premaster secret storage 330, reaper 350 extracts the reply pointer from the entry to be deleted and places the reply pointer on available memory queue 340.

Additionally, reaper 350 requests and receives a timestamp and scans session storage 318 in a similar manner to the way that option selection manager 316 scans hello storage 326 and premaster secret storage 324 and deletes any session ID entries that reaper 350 finds that are older than the session ID lifetime.

Another Embodiment

Figure 2B:
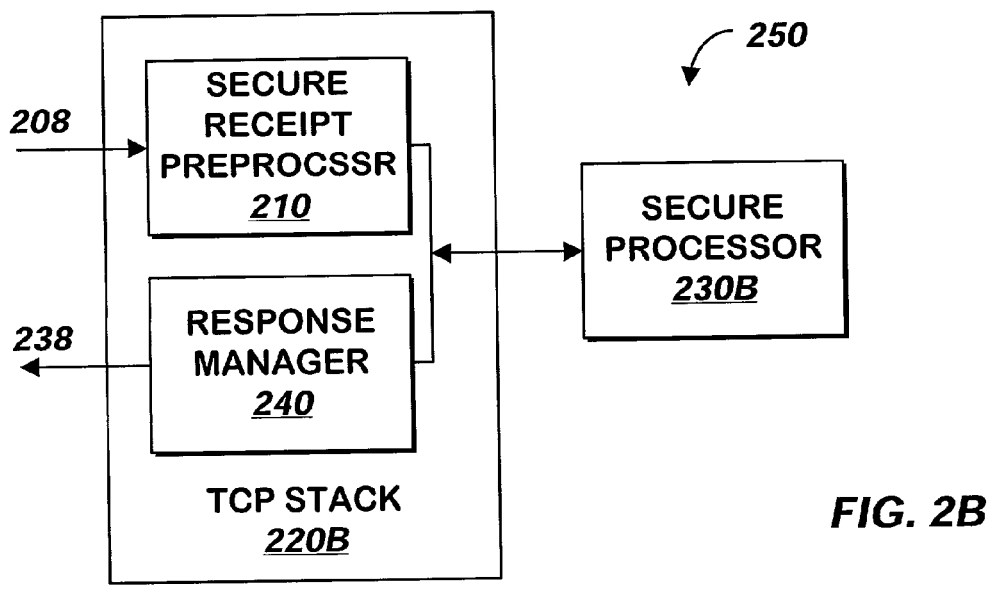
FIG. 2B is a block schematic diagram of a system for establishing a secure connection according to another embodiment of the present invention.

In another embodiment, instead of residing in front of the conventional TCP stack 220A as shown in FIG. 2A, secure receipt preprocessor 210 and response manager 240 are made part of a modified TCP stack 220B as will now be described. Referring now to FIG. 2B, a block schematic diagram of a system for efficiently initializing a secure connection is shown according to another embodiment of the present invention. Secure receipt preprocessor 210 and response manager 240 operate as described above, but are a part of TCP stack 220B.

Secure receipt preprocessor 210 of system 250 receives a client hello via input 208 from a client wishing to initiate a secure communication, as described above.

Secure receipt preprocessor 210 stores the client hello, generates portions of a server hello, and sends the portions to response manager 240 as described above. Response manager builds and sends the server hello to the client via output 238 as described above.

Secure receipt preprocessor 210 receives a reply containing a premaster secret from the client, as described above. Secure receipt preprocessor 210 locates and sends the stored client hello to secure processor 230B via TCP stack 220B, rather than via TCP stack 220A as described above. Secure processor 230B generates and sends a server hello, but not a server certificate or a client certificate request, to response manager 240. In one embodiment, secure processor 230B operates identically to secure processor 230A and sends both a server certificate and a client certificate request if the appropriate options are true. Response manager 240 extracts and stores the session ID from the server hello, and discards the remainder of the server hello as described above. In another embodiment, secure processor 230B does not send the server certificate or client certificate request, even if one or both are provided by secure receipt preprocessor 210 and response manager 240 as described above, nor does it send a complete server hello: instead secure processor 230B only sends the session ID in place of the server hello.

It isn't necessary to have all of the options set consistently with the secure processors 230A, 230B. For example, the request client certificate and provide server certificate options may be set to true even if secure processor 230A or 230B will not send them and the session ID lifespan option may be set much smaller than the corresponding duration in secure processor 230A or 230B to prevent the circumstance of the session ID being accepted and then rejected as described above.

In one embodiment, if the destination port of an incoming communication does not correspond to an HTTPS port, client communication receiver 310 sends the communication to TCP stack 220A via output 304.

Figure 4A:
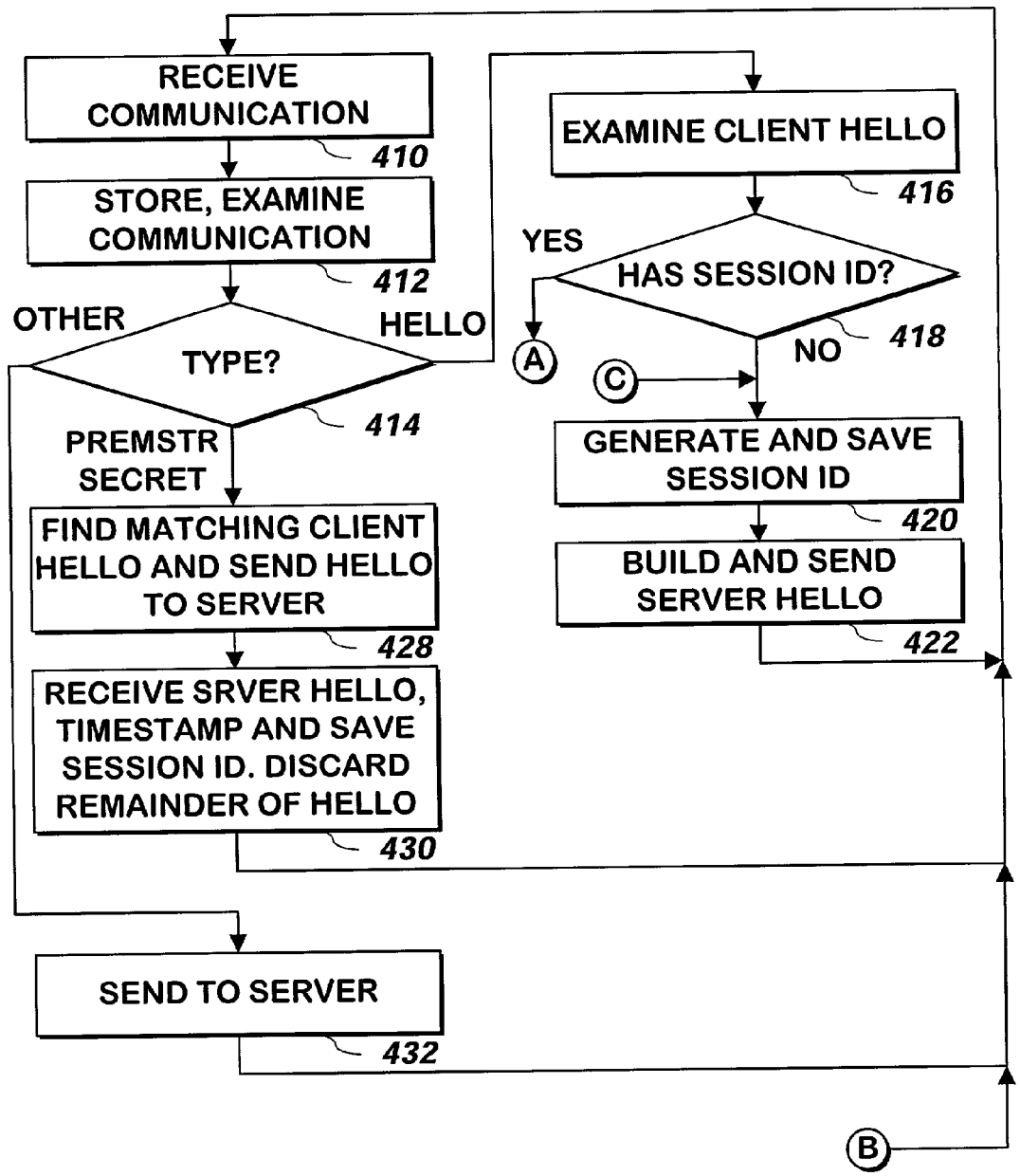
FIG. 4, consisting of FIG. 4A and FIG. 4B, is a flowchart illustrating a method of efficiently initializing a secure connection according to one embodiment of the present invention.
Figure 4B:
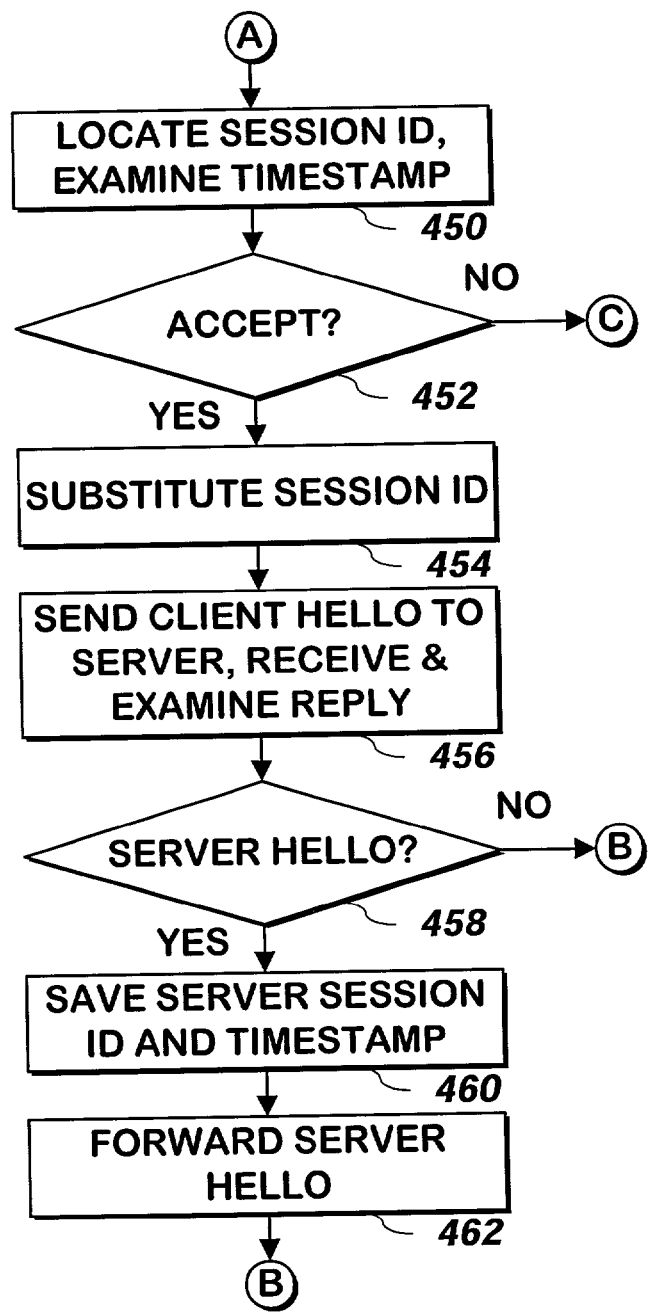

Referring now to FIG. 4, consisting of FIG. 4A and FIG. 4B, a flowchart illustrating a method of efficiently initializing a secure connection is shown according to one embodiment of the present invention. A communication is received 410, and the communication is stored and examined 412 as described above. If the communication is a client hello 414 (because it does not correspond to an open session), the client hello is examined 416 as described above. If the client hello does not contain a session ID 418, a session ID is generated and saved 420 as described above. A server hello is built 422 and sent as described above, and the method continues with step 410.

If the client hello contains a session ID 418, then the session ID entry is located 450 and the timestamp and/or other characteristics examined as described above. If the session ID is not acceptable 452 as described above, then the method continues with step 420. If the session ID is acceptable 452, then the server session ID is substituted 454 for the session ID in the client hello as described above. The client hello so modified is sent 456 to the server, and the server's reply is received and examined as described above.

If the server has sent a server hello 458, then the session ID from the server hello is extracted, saved and timestamped 460 as described above, the server hello is forwarded 462 to the client as described above, and the method continues with step 410.

If the communication is a premaster secret reply 414, the matching client hello is found 428 and sent to the server as described above. The server hello is received, the session ID from the server hello is extracted, saved and timestamped, the remainder of the server hello is discarded as described above 430, and the method continues with step 410.

If the communication is not a client hello or a premaster secret reply 414, the communication is sent 432 to the server as described above and the method continues with step 410.

What is claimed is:

1. A method for initiating a private secure connection between at least one client and a remote server interconnected by a public network for transmission of enciphered communications, the method comprising the steps of:

equipping the remote server with at least one secure processor configured for running at least one secure server process for independently initiating and maintaining a private secure connection with the at least one client;

communicatively coupling a first secure receipt pre-processor and a response manager to the at least one client via the public network and to the remote server via a protocol stack associated with a first layered communication protocol, the remote server being configured with an operating system operative to selectively direct the at least one secure server process;

storing at least one user supplied configuration option expressing at least one secure server process capability supporting the initiating and maintaining of the private secure connection with the at least one client;

receiving at the first secure receipt pre-processor, mediated by an interface compatible with the first layered communication protocol, a first client communication originating at the at least one client and transmitted over the public network using the first layered communication protocol, the first client communication expressing at least one client capability supporting the initiating of the private secure connection with the remote server;

storing the first client communication after retaining a pointer to the first client communication;

responsive to the receipt of the first client communication, generating at the first secure receipt pre-processor, independent of the first secure server process, a first client-related identification object based on the first client communication;

generating a first client-related data-object embodying the pointer to the first client communication, a time-stamp obtained from the operating system and the first client-related identification object;

hashing the identification object using a hashing algorithm to create a first hash index;

storing the first client-related data-object indexed by the first hash index after associating a unique session identifier to the first-client-related data object;

comparing the at least one user supplied configuration option with the first client-related data object to generate a portion of a complete first server communication to the client that is consistent with the at least one capability expressed in the first client communication;

based upon the portion of the complete first server response and the layered communications protocol, generating at the response manager and communicating to the at least one client the complete first server communication responsive to the first client communication and expressing at least one server capability for supporting the initiation of the private secure connection with the at least first client;

responsive to the receipt of the complete first server communication at the at least one client, receiving at the first secure receipt pre-processor a first client reply, mediated by the interface compatible with the first layered communication protocol, containing a pre-master secret transmitted from the client, the pre-master secret being based at least in part upon the complete first server communication communicated to the at least one client by the response manager;

generating at the first secure receipt pre-processor, independent of the first secure server process, a second client-related identification object based on the first client reply;

retrieving the first client-related data-object embodying the first client-related identification object matching the second client-related identification object;

generating a first remote server response under direction of the first secure server process by using the first client-related data-object forwarded to the remote server through the intermediation of the protocol stack;

communicating the first remote server response to the response manager, through the intermediation of the protocol stack at the response manager, creating a first server-related search object based on the first server response;

under direction of the first secure server process, generating a session key using the pre-master secret in the first client reply; and encrypting subsequent communications, between the remote server and the at least one client over the public network using the session key.

2. The method of claim 1 wherein the step of generating the first complete server response to the client further includes the steps of:

choosing a lesser of a protocol version contained in the first client communication and a protocol version in the at least one user supplied configuration option if the first client communication contains a protocol version;

choosing a first compression method indicated in a list of compression methods contained in the first client communication that is also in a list of compression methods in the at least one configuration options if the first client communication contains a list of compression methods;

examining a "request client authentication" option stored in the at least one user supplied configuration option and upon the "request client authentication" option being true, constructing a client authentication request; and examining a "provide server authentication" option stored in the at least one user supplied configuration option, and upon the "provide server authentication" option being true, examining a chosen cipher and using the chosen cipher to choose a server authentication from a certificate storage.

3. The method of claim 1 wherein the hashing algorithm comprises an algorithm selected from the set consisting of one of: a Rivest Shamir Adelman (RSA), a Message-Digest algorithm 5 (MD5) and a Secure Hash Algorithm (SHA).

4. The method of claim 1 wherein the layered communication protocol is the Transfer Control Protocol (TCP).

5. A method for initiating a private secure session for secured data communications over an unsecured network, the method comprising:

providing a server running under an operating system that controls at least a first process and a second process, the server including a secure receipt pre-processor, a response manager and a secure processor communicatively coupled to each other, wherein the secure receipt pre-processor and optionally the response manager are operationally directed by the first process and the secure processor is operationally directed by the second process;

receiving a client communication from a client at the secure receipt pre-processor;

classifying the client communication into one of a client hello having a first expression indicative of initiating the private secure session with the secure processor, a client reply having a pre-master secret created responsive to a server hello, and an encrypted client communication;

if the received client communication is the client hello and the client hello is missing a secure session identifier, buffering the client hello at the secure receipt pre-processor after generating and assigning a secure session identifier to the client hello, and saving the secure session identifier;

responsive to the client hello, generating and forwarding to the client a server hello cooperatively between the secure receipt pre-processor and the response manager independent of the second process, the server hello including at least one second expression to enable the client to initiate the private secure session;

if the received client communication is the client hello and the client hello includes the secure session identifier, locating the secure session identifier and examining a timestamp associated with the secure session identifier;

if the timestamp associated with secure session identified is unacceptable, generating and forwarding to the client the server hello cooperatively between the secure receipt pre-processor and the response manager independent of the second process, the server hello including the at least one second expression to enable the client to initiate the private secure session;

if the timestamp associated with secure session identified is acceptable, substituting the secure session identifier by a sever session identifier, sending the client hello to the secure server, receiving and examining a secure server reply;

upon detecting a secure server reply that is a server hello, saving the server session identification and the timestamp before forwarding the server hello to the client, otherwise forwarding the secure server reply to the client;

upon receiving the client reply at the secure receipt pre-processor responsive to the first client hello, wherein the client reply is in a first ciphertext form and including the pre-master secret based at least in part on the at least one second expression, forwarding the client hello that corresponds to the client reply received at the secure receipt pre-processor to the secure processor;

assigning the server session identifier associated with the first client hello to the private secure session;

using the pre-master secret in the client reply to generate a session key at the secure server; and using the session key to process encrypted client communications at the secure server and for encrypting communications before forwarding to the client.

* * * * *